G. S. WALKER.
FOOD STEAMING TRAY.
APPLICATION FILED MAR. 2, 1909.
935,177.
Patented Sept. 28, 1909.
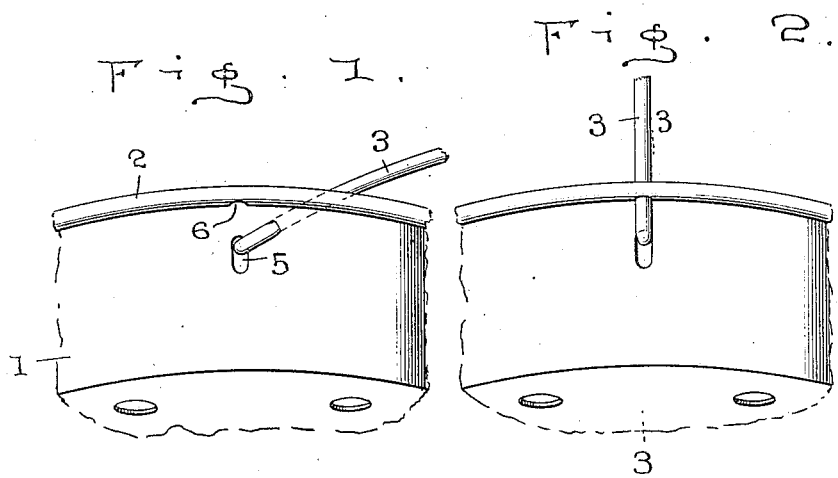
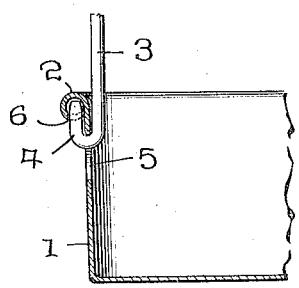
WITNESSES:
INVENTOR
G. S. Walker
BY
W. J. Fitzgerald
Attorneys

UNITED STATES PATENT OFFICE.

GEORGE S. WALKER, OF LEMONT, ILLINOIS.

FOOD-STEAMING TRAY.

935,177. Specification of Letters Patent. Patented Sept. 28, 1909.

Application filed March 2, 1909. Serial No. 480,819.

*To all whom it may concern:*

Be it known that I, GEORGE S. WALKER, a citizen of the United States, residing at Lemont, in the county of Cook and State of Illinois, have invented certain new and useful Improvements in Food-Steaming Trays; and I do hereby declare the following to be a full, clear, and exact description of the invention, such as will enable others skilled in the art to which it appertains to make and use the same.

My invention relates to new and useful improvements in bail attachments for food steaming trays and particularly to that class adapted to be used for steaming vegetables, or the like, and my object is to provide means for attaching the bail to the tray in such manner as to prevent the tray from tilting accidentally and a further object is to provide means whereby the bail may be released and permitted to swing.

Other objects and advantages will be hereinafter referred to and more particularly pointed out in the claims.

In the accompanying drawings forming part of this application, Figure 1 is a detail perspective view showing the bail in its tilted position. Fig. 2 is a similar view showing the bail in its fixed relation with the tray. Fig. 3 is a sectional view as seen on line 3—3, Fig. 2.

Referring to the drawings in which similar reference numerals designate corresponding parts throughout the several views, 1 indicates the body of the tray and 2 indicates the bead such as is usually formed at the upper edge of vessels of this class, said bead being formed by rolling the free edge of the wall of the vessel.

The tray 1 is provided with a bail 3, the ends of which are provided with hooks 4, which fit through slots 5 in the wall of the tray, the terminals of said hooks being of such length as to enter an opening or seat 6 in the bead 2, said opening being placed vertically above the slot 5 so that the bail will be held in a fixed vertical position when the tray is being transported by the bail.

The object in entering the terminal of the hook in the opening is to prevent the tilting of the tray while the tray is being carried from place to place, but if it is desired to tilt the tray on the bail, the bail is lowered in the slots 5 until the terminal of the hook is disengaged from the opening 6, when the bail may be swung to either side as desired.

What I claim is:

1. The combination with a tray having slots therein, a bead at the upper edge of the tray, said beads having openings; of a bail having hooks adapted to extend through said slots, the terminals of said hooks being adapted to enter the openings in the bead and hold the bail in a fixed position.

2. The combination with a tray; of a bail pivotally attached to the wall of the tray, a bead around the upper edge of the tray, said bead having seats therein adapted to engage parts of the bail and hold the same in a fixed position.

In testimony whereof I have signed my name to this specification in the presence of two subscribing witnesses.

GEORGE S. WALKER.

Witnesses:
EDMOND J. FITZGERALD,
A. HASTINGS.